US009536252B2

(12) United States Patent
Gupta

(10) Patent No.: US 9,536,252 B2
(45) Date of Patent: Jan. 3, 2017

(54) METHOD AND APPARATUS FOR ENABLING TARGETED MESSAGES BASED ON USAGE OF A DOCUMENT ACCESSED WITHIN AN INTERNET BROWSER

(71) Applicant: Adobe Systems Incorporated, San Jose, CA (US)

(72) Inventor: Anuj Gupta, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 414 days.

(21) Appl. No.: 14/013,352

(22) Filed: Aug. 29, 2013

(65) Prior Publication Data
US 2015/0066642 A1 Mar. 5, 2015

(51) Int. Cl.
G06Q 30/00 (2012.01)
G06Q 30/02 (2012.01)

(52) U.S. Cl.
CPC .................................. G06Q 30/0255 (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0186241 A1* | 12/2002 | Kohda | ............... | G06F 17/30011 715/744 |
| 2004/0034624 A1* | 2/2004 | Deh-Lee | ................. | H04L 67/26 |
| 2004/0153462 A1* | 8/2004 | Bardwell | ........... | G05B 19/4069 |
| 2007/0073553 A1* | 3/2007 | Flinn | .................... | G06N 99/005 705/1.1 |
| 2007/0130183 A1* | 6/2007 | Morris | .............. | G06F 17/30595 |
| 2007/0136467 A1* | 6/2007 | Masci | ...................... | G06F 15/02 709/225 |
| 2008/0052278 A1* | 2/2008 | Zlotin | .................... | G06Q 30/02 |
| 2008/0065737 A1* | 3/2008 | Burke | ............... | G06F 17/30058 709/217 |
| 2008/0082907 A1* | 4/2008 | Sorotokin | ............. | G06F 17/212 715/210 |
| 2008/0091513 A1* | 4/2008 | Waggoner | ......... | G06F 17/30029 705/7.33 |
| 2009/0164287 A1* | 6/2009 | Kies | .................... | G06Q 30/0277 705/1.1 |
| 2009/0187593 A1* | 7/2009 | Chen | .................. | G06F 17/30029 |
| 2010/0122271 A1* | 5/2010 | Labour | ............... | G06F 9/44526 719/328 |
| 2010/0217722 A1* | 8/2010 | Flinn | .................. | G06F 17/30699 705/319 |
| 2011/0066957 A1* | 3/2011 | Prats | ..................... | G06F 17/241 715/753 |
| 2012/0047005 A1* | 2/2012 | Connelly | ........... | G06Q 30/0241 705/14.4 |
| 2012/0047013 A1* | 2/2012 | Bigby | .................... | G06Q 30/02 705/14.52 |

(Continued)

Primary Examiner — Matthew T Sittner
(74) Attorney, Agent, or Firm — Keller Jolley Preece

(57) ABSTRACT

A computer implemented method and apparatus for enabling targeted messages based on usage of a document accessed within an Internet browser, wherein the document is not a webpage. The method comprises accessing a document within a browser on a device using an application associated with the document; and recording, by the application, usage behavior data during usage of the document accessed within the browser.

20 Claims, 3 Drawing Sheets

(56) References Cited

U.S. PATENT DOCUMENTS

| | | | |
|---|---|---|---|
| 2012/0072913 A1* | 3/2012 | Uola | G06F 9/5033 718/100 |
| 2012/0096342 A1* | 4/2012 | Wang | G06F 17/30011 715/234 |
| 2012/0143677 A1* | 6/2012 | Bruno | G06Q 30/0256 705/14.46 |
| 2012/0143694 A1* | 6/2012 | Zargahi | G06Q 30/0603 705/14.66 |
| 2012/0191536 A1* | 7/2012 | Chen | G06Q 30/02 705/14.49 |
| 2012/0194844 A1* | 8/2012 | Natori | G06F 3/1205 358/1.13 |
| 2012/0197728 A1* | 8/2012 | Luna | G06Q 30/02 705/14.64 |
| 2012/0257249 A1* | 10/2012 | Natarajan | G06F 17/30011 358/1.15 |
| 2012/0323694 A1* | 12/2012 | Lita | G06Q 30/00 705/14.66 |
| 2013/0073395 A1* | 3/2013 | Rincon | H04M 3/4878 705/14.66 |
| 2013/0104041 A1* | 4/2013 | Seshagiri | G06F 11/3414 715/704 |
| 2013/0171965 A1* | 7/2013 | Schrecker | H04B 5/0006 455/411 |
| 2013/0212183 A1* | 8/2013 | Ward | G06F 9/541 709/206 |
| 2013/0325858 A1* | 12/2013 | Xu | G06F 17/30699 707/730 |
| 2013/0326499 A1* | 12/2013 | Mowatt | G06F 8/60 717/177 |
| 2014/0019837 A1* | 1/2014 | Shin | G06Q 30/02 715/205 |
| 2014/0082001 A1* | 3/2014 | Jang | G06F 21/552 707/755 |
| 2014/0108909 A1* | 4/2014 | Geelnard | G06F 17/30902 715/234 |
| 2014/0179270 A1* | 6/2014 | Anand | H04W 12/12 455/410 |
| 2015/0012809 A1* | 1/2015 | Kaushik | G06F 8/51 715/234 |
| 2015/0066642 A1* | 3/2015 | Gupta | G06Q 30/0255 705/14.53 |

* cited by examiner

METHOD AND APPARATUS FOR ENABLING TARGETED MESSAGES BASED ON USAGE OF A DOCUMENT ACCESSED WITHIN AN INTERNET BROWSER

BACKGROUND OF THE INVENTION

Field of the Invention

Embodiments of the present invention generally relate to document usage tracking and, more particularly, to a method and apparatus for enabling targeted messages based on usage of a document accessed within an Internet browser.

Description of the Related Art

An Internet cookie is a text file created by a website server when a user accesses a page on a website. The Internet cookie is stored on a user's computer, and is sent from the user's computer to the website server each time the user's browser requests a page from the website server. Internet cookies provide websites and online advertisers with information about a website user, such as user behavior while interacting with a webpage within a browser. Online advertisers use the cookies to show targeted messages of products or services that may be of interest to the user based on the user's prior interactions with the webpage.

Although information may be gathered about a user's interactions with a webpage, when a document is viewed within a browser, user behavior based on interaction with the viewed document cannot be tracked. For example, conventional Internet cookies tracking webpage user interactions are incapable of tracking user behavior within a Portable Document Format (PDF) document associated with, for example, ADOBE® READER®, while the PDF document is accessed within a browser. Being unable to track such user interaction represents a lost marketing opportunity for online advertisers.

Therefore, there is a need for a method and apparatus for enabling targeted messages based on usage of a document accessed within an Internet browser.

SUMMARY OF THE INVENTION

A method and apparatus for enabling targeted messages based on usage of a document accessed within an Internet browser substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
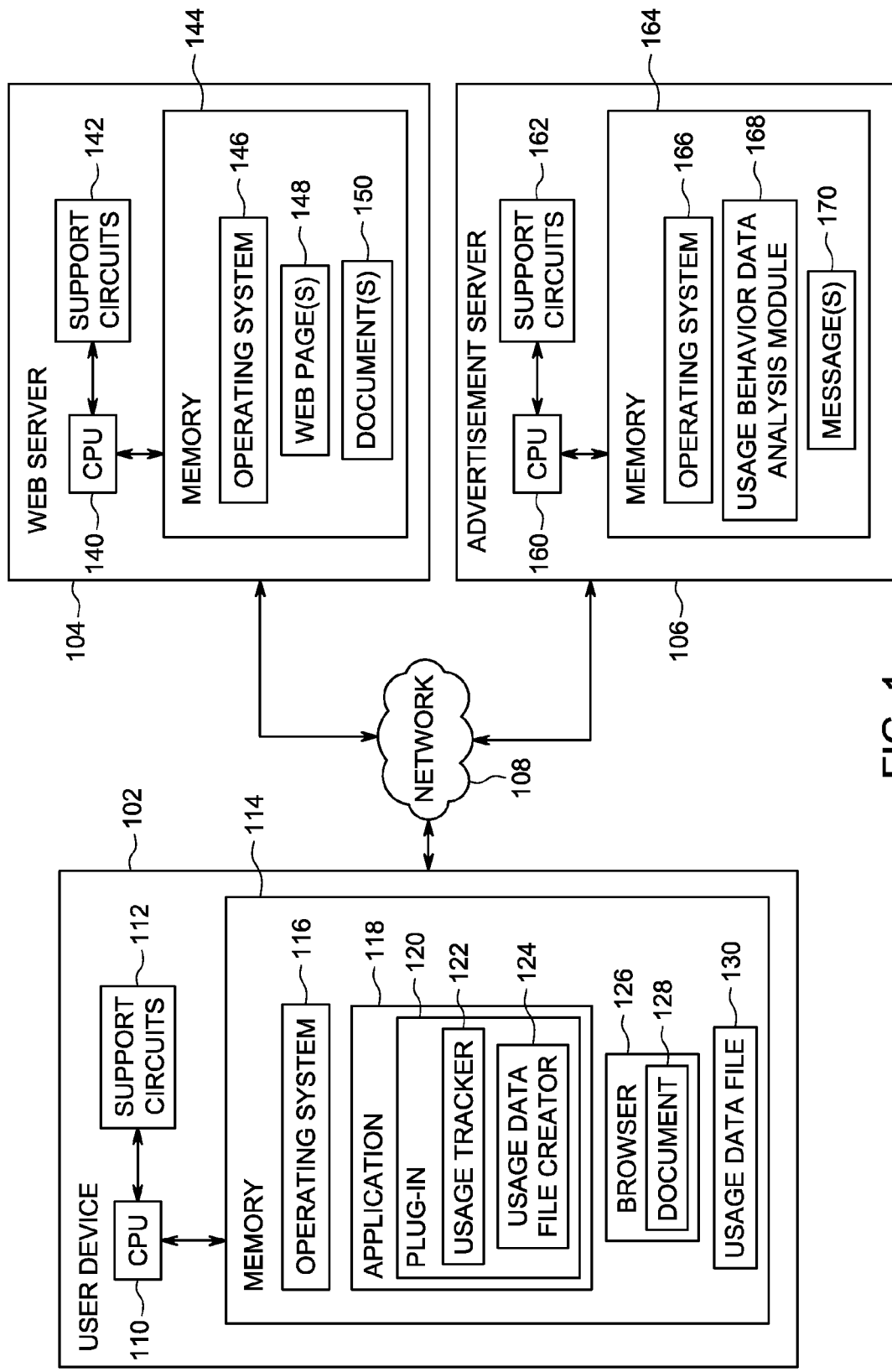
FIG. 1 is a block diagram of a system for enabling targeted messages based on usage of a document accessed within an Internet browser, according to one or more embodiments.

While the method and apparatus is described herein by way of example for providing targeted messages based on usage of a document accessed within an Internet browser, those skilled in the art will recognize that the method and apparatus for providing targeted messages based on usage of a document accessed within an Internet browser is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for providing targeted messages based on usage of a document accessed within an Internet browser defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for enabling targeted messages based on usage of a document, wherein the document is not a webpage, accessed within an Internet browser. The document is accessed within the browser in its native format, using a document processing application associated with the document type, via a document processing application browser plug-in. The document processing application is not an Internet browser application. The usage of the document is useful to identify a level of interest in the content of the document. In some embodiments, the document is a Portable Document Format (PDF) document associated with, for example, ADOBE® READER®. According to several embodiments of the present invention, a user accesses a document within a browser on a user device. A uniform resource locator (URL) is selected for accessing the document in the browser. The URL is hyperlinked to the document stored on a network or a local destination. The document is accessed within the browser using a plug-in of a document processing application associated with the document type of the document. The plug-in, in combination with the document processing application, renders the document in the browser, for example, for access by the user. The document processing application records usage behavior while the user interacts with the document in the browser, and stores usage behavior data to a usage data file.

The usage behavior may include various user operations on the document or parts thereof, including but not limited to viewing, copying text and/or images, printing, saving a local copy, an amount of time the document is accessed, an amount of time spent by the user on a specific page or aspect of the document, links that are accessed within the document, and the like. For example, a user may navigate to a website for a NIKON® camera. The website may include a link to a product brochure (a PDF document) for the camera. When the user activates the link, the product brochure is displayed in the browser, and usage data is collected while the user interacts with the product brochure. The Internet browser is incapable of providing access to, or displaying the brochure in its native format, that is, the PDF format. According to various embodiments, upon selection of the hyperlink to the PDF document, the browser invokes, via a plug-in, a document processing application associated with the PDF document, e.g. ADOBE® READER®, to display the brochure in the PDF format within the browser. The ADOBE® READER® plug-in is a component of ADOBE® READER®, and the plug-in is registered with the browser as the handler for the PDF document type. Once the document is accessible within the browser, the user may, for example, spend 30 minutes viewing the brochure, and may further process (edit, modify, sign electronically, share, publish etc.) the document. The user may save the brochure to the user's local machine or share the brochure via email. This type of usage may be interpreted as showing a high level of interest in the camera. Alternatively, the user may activate the link to view the product brochure, and then close the document immediately. This type of usage may be interpreted as showing a lack of interest in the camera by the user.

The plug-in or the document processing application tracks usage behavior while the user interacts with the PDF document, and captures usage behavior data, for example, via a usage tracker. The plug-in or the document processing application, for example, via a usage data file creator, stores the usage behavior data to a usage data file as the usage behavior data is generated, or stores the usage behavior data in a cache temporarily, for later storage of the usage behavior data to the usage data file. The usage data file is stored, for example, at a location associated with the browser, or the document processing application, or any other pre-specified location or locations. The pre-specified locations include a network and/or local destination. In some embodiments, the usage data file is transmitted to a pre-specified remote location, for example, a network location where the usage data file is stored. The usage data file containing the usage behavior data is made accessible to marketing organizations, or entities that provide data to marketing organizations.

Based on the document usage behavior data for a document that is not a webpage, and is accessed in its native format within a browser, marketing organizations deliver messages, such as targeted advertisements, to the user. For example, while the user is viewing the NIKON® camera product brochure, usage interaction with the brochure is communicated to a marketing organization, and based on the usage interaction or the level of interest of the user in the NIKON® camera product brochure, a promotional message, such as an advertisement or a discount coupon for a NIKON® camera or a competing product, such as a CANON® camera, is pushed to the user. The promotional message is displayed in the browser outside the document, or displayed in the document being viewed within the browser, that is the NIKON® camera product brochure, in this example. As another example, a user may close or navigate away from the web browser session where they viewed the NIKON® camera product brochure, and visit a website for a news source in a separate browser session. Based on the usage behavior data collected while the user was viewing the product brochure, a marketer may display an ad on the news source website to purchase a NIKON® camera, or similar products, for example. According to some embodiments, for a PDF document viewed within a browser using ADOBE® READER®, usage data obtained is integrated with analytics data, for example, obtained using GOOGLE® ANALYTICS®. The analytics integrated usage data is sent to ad placement systems, for example, as used by marketing organizations. In response, the ad placement systems send a promotional message, such as an advertisement, for display to a user viewing the PDF document, in accordance with embodiments of the invention, thereby eliminating the need to send usage data to intermediate entities such as data gatherers, and directly providing the usage data, or analytics integrated usage data to advertisers or marketing organizations.

Accessing the document in a browser in the document's native format includes accessing and/or processing the document from within the browser, as opposed to accessing the document on a user's device using a default or native application associated with the document without the use of a browser. The term "document" as used herein is a document that is associated with an application other than the browser application, such as a PDF document associated ADOBE® READER®, a WORD document associated with MICROSOFT® WORD®, an image, audio or a video file and its meta-data associated with an image, audio or video viewing application, and several other documents known in the art, that are not a webpage associated with a browser application. Correspondingly, the document processing application includes applications such as the ADOBE® READER®, MICROSOFT® WORD®, and other document processing applications that are not a browsing application and are generally not associated with Internet browsing. Further, native format of a document is the file format in which the document is typically created, edited, accessed or published by an associated application, and such file format is also native to the application. Therefore, PDF file format is the native format for a PDF document, and also for applications such as the ADOBE® READER®, ADOBE® PROFESSIONAL®, and other commercially available PDF viewing, creating, editing or publishing applications.

According to some embodiments, when a PDF document is accessed from within a browser, an ADOBE® READER® plug-in associated with the browser provides access to the document within the browser, by launching ADOBE® READER® within the browser. The usage data file is made accessible to marketing organizations that access the usage behavior data, and based on the usage behavior data, deliver targeted advertisements or promotional messages to the user.

In some embodiments, functions carried out by the plug-in are carried out by the document processing application, or both the plug-in and the document processing application acting together. Accordingly, as used herein, the words document processing application includes the application plug-in that enables access of a document intended to be accessed by a given document processing application, unless the plug-in is specifically referred to in the described embodiments as being separate from the document processing application. The application plug-in is usually registered with the browser when the application is installed, however, the plug-in may also be registered at a later time. According to some embodiments, the application plug-in is registered with the browser as an ActiveX control, for a particular document type or file format, also referred to or identified by the browser as corresponding MIME (Multipurpose Internet Mail Extensions) types. According to some embodiments, the plug-in is a part of the document processing application, and is invoked by the browser when a document with corresponding document type is selected for access within the browser. In some embodiments, one or both of the usage tracker and the usage data file creator are implemented as components of the plug-in. In some embodiments, or both of the usage tracker and the usage data file creator are implemented as components of the document processing application.

Advantageously, marketers of desktop and mobile document processing applications, such as ADOBE® Systems Incorporated of San Jose, Calif., can enable targeted messages on a desktop or a mobile device based on usage of a document accessed within an Internet browser in the document's native format, wherein the document is not a webpage. Because the usage behavior of a user's interaction is captured in a usage data file, online advertisement companies can access the usage data file, and based on the usage behavior for a document accessed within a browser, provide targeted messages to the user.

Various embodiments of a method and apparatus for enabling targeted messages based on usage of a document accessed within an Internet browser are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for enabling targeted messages based on usage of a document accessed within an Internet browser, according to one or more embodiments. The system 100 includes a user device 102, a web server 104, and an advertisement server 106, communicatively coupled to one another via a network 108. The user device 102 is a computing device, such as a desktop computer, laptop, tablet computer, mobile device, and the like. The user device 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, an application 118, a browser 126, and a usage data file 130. The operating system 116 may include various commercially known operating systems. The application 118 may be any document processing application, such as ADOBE® READER®, ADOBE® PHOTOSHOP®, ADOBE® ACROBAT®, MICROSOFT® WORD®, and the like, capable of displaying and/or processing documents based on instructions received from a user of the user device 102. The application 118 includes a plug-in 120 for the browser 126. The plug-in 120 provides access to a document 128 within the browser 126 by launching the application 118 within the browser 126.

Each document type is identified by the browser 126 using a corresponding MIME (Multipurpose Internet Mail Extensions) type. The plug-in 120 is registered as a handler for the MIME-type associated with the document type of the document 128. When the document 128 is accessed within the browser 126, the browser 126 recognizes the MIME-type for the document 128, and invokes the plug-in 120, which launches the application 118 to display the document 128 within the browser 126.

In the embodiment illustrated by FIG. 1, the plug-in 120 includes a usage tracker 122 for recording usage behavior during the usage of the document 128 accessed within the browser 126. The plug-in 120 also includes a usage data file creator 124 for creating the usage data file 130, including the recorded usage behavior data. The usage data file creator 124 also stores and/or transmits the usage data file 130, for example to a pre-specified location. The plug-in 120, the usage tracker 122 and the usage data file creator 124 are components of the application 118, that extend the functionality of the application 118 to the browser, and in several embodiments, the plug-in 120, the usage tracker 122 and the usage data file creator 124 work from within the browser.

It is noted that in some embodiments, portions of the user device 102 may be implemented as a virtual machine without departing from the scope and spirit of the invention. It is also noted that in some embodiments, the application 118 is implemented as a cloud based application without departing from the scope and spirit of the invention. Further, the usage tracker 122 and the usage data file creator 124 are not necessarily implemented as components of the plug-in 120. According to several embodiments (not shown), for example, any or both of the usage tracker 122 and the usage data file creator 124 are implemented as components of the application 118, and are correspondingly not a part of the plug-in 120.

The application 118 can access the document level data, application level data and the system level data. For example, the application has access to the document level data of the document being accessed, e.g. document ID, keywords or metadata for the document or any parts thereof, electronic signatures, and the like. The application 118 also logs information on activities or events the application 118 executes within the browser. Specifically, any functionality in the application 118 invokes a corresponding function at the application binary level, details of which are captured by the application 118. For example, when a print command is requested, the application print function is invoked, and the application 118 logs the date, time, and frequency of invocation of the print function. The application 118 can query the operating system of the device, for example, the operating system 116 of FIG. 1, to obtain information including the IP address of the device, operating system identification information, and details of CPU, memory and installed devices, for example. According to several embodiments, the usage tracker 122 captures one or more of the document level, application level or system level information as usage behavior data, and the usage data file creator 124 creates the usage data file 130 and stores the usage behavior data to the usage data file 130.

The web server 104 is a computing device, such as a desktop computer, laptop, tablet computer, mobile device and the like. The web server 104 may be a web server and includes a Central Processing Unit (CPU) 140, support circuits 142, and a memory 144. The CPU 140 may include one or more commercially available microprocessors or microcontrollers that facilitate data processing and storage. The various support circuits 142 facilitate the operation of the CPU 140 and include one or more clock circuits, power supplies, cache, input/output circuits, and the like. The memory 144 includes at least one of Read Only Memory (ROM), Random Access Memory (RAM), disk drive storage, optical storage, removable storage and/or the like. The memory 144 includes an operating system 146, a message 148, and one or more documents 150. The operating system 146 may include various commercially known operating systems. The web server 104 serves one or more web pages and/or documents to a requesting entity. For example, the web server 104 sends, upon request by the browser 126, a copy of the document 128 from the documents 150 to the browser 126. The browser 126 stores the document 128 on the user device 102, for example, at a temporary storage location available to the browser 126.

The advertisement server 106 is a computing device, such as a desktop computer, laptop, tablet computer, mobile device and the like. The advertisement server 106 includes a Central Processing Unit (CPU) 160, support circuits 162, and a memory 164. The CPU 160 may include one or more commercially available microprocessors or microcontrollers that facilitate data processing and storage. The various support circuits 162 facilitate the operation of the CPU 160 and include one or more clock circuits, power supplies, cache, input/output circuits, and the like. The memory 164 includes at least one of Read Only Memory (ROM), Random Access Memory (RAM), disk drive storage, optical storage, removable storage and/or the like. The memory 164 includes an operating system 166, a usage behavior data analysis module 168, and one or more messages 170. The operating system 166 may include various commercially known operating systems. The advertisement server 106 sends promotional messages 170 to the user device 102 via network 108. The usage behavior data analysis module 168 analyzes the usage behavior data from the usage data file 130, for example, to determine a level of interest of the user in the document 128 or portions thereof, and based on the analysis of the user's interest in the document 128, sends one or more messages 170 for presentation at the user device 102.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

When a user selects the document 128 for access using a URL, the browser 126 downloads the document 128 from the web server 104 to the user device 102, for example, in a temporary folder for storing downloaded documents. Upon recognizing the document type (or MIME-type) of the document, the browser 126 invokes the plug-in 120, which is a registered handler for MIME-type associated with the document 128. The plug-in 120 activates or launches the application 118 to display the document 128 within the browser 126. The application 118 is a default or native application associated with the document type of the document 128. According to several embodiments, the document 128 is accessed in its native format within the browser 126. According to some embodiments, the application 118 is launched within the browser, and no instance of the application 118 is active outside of the browser 126. In some embodiments, one or more instances of the application 118 are active outside of the browser 126, and the plug-in 120 activates an instance of the application 118 within the browser 126 to provide access to the document 128 within the browser 126.

With user device 102, a user may interact with the document or parts thereof in the browser, for example, the user may view, print, copy text, copy images, save a local copy, take a snapshot, sign the document, modify or prepare the document for electronic signatures, or conduct several other processing operations as known in the art. The usage tracker 122 records usage behavior data comprising the user interaction information with the document 128 accessed within the browser 126. The usage data file creator 124 creates the usage data file 130 and stores the usage data file 130 on the user device, for example, at locations generally tracked by third parties for usage data files, or at pre-designated locations for storage of the usage data file 130. In some embodiments, on creation of the usage data file 130, the usage data file creator 124 stores the document ID, the date and/or time of access of the document 128, and the IP address of device that accessed the document 128. The usage data file creator 124 stores the usage behavior data obtained from the usage tracker 122, for example, as and when received, to the usage data file 130.

According to several embodiments, the usage data file creator 124 stores or transmits the usage data file 130, for access by the advertisement server 106. The usage behavior data analysis module 168 analyzes the usage data file 130, for example, using generally known techniques in the art, to identify a level of interest of the user in the document 128 or portions thereof. Based on the level of interest of the user in the document 128, and the document information, the usage behavior data analysis module 168 identifies one or more messages 170 that are relevant to the user. The usage behavior data analysis module 168 sends the one or more messages 170 identified, to the user device 102, for display to the user. It is noted that various techniques for identification of messages based on user's interest in a document or parts thereof as known in the art may be used within the scope of embodiments described herein.

Figure 2:
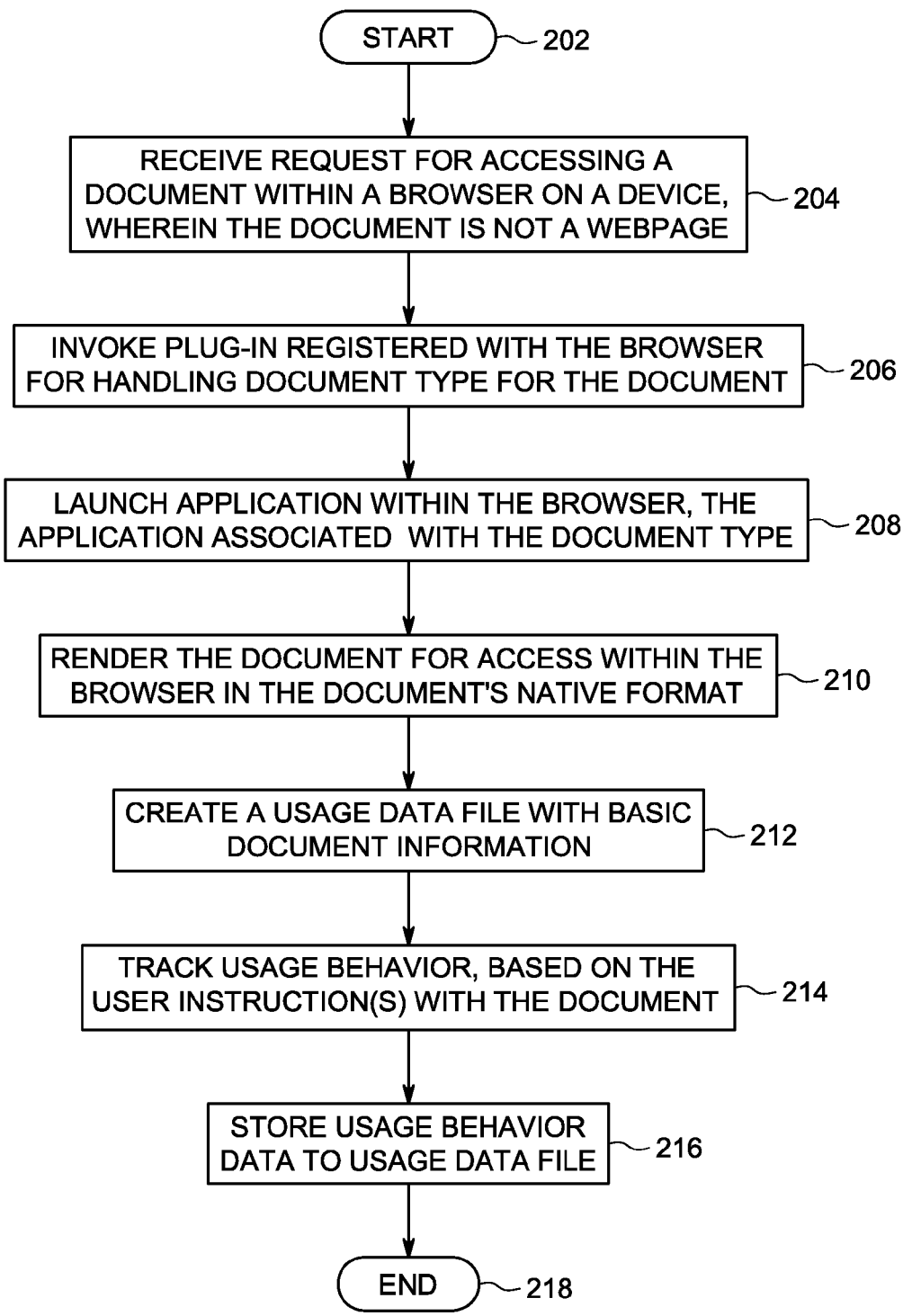
FIG. 2 is a flowchart of a method for enabling targeted messages based on usage of a document accessed within an Internet browser, as performed by the plug-in of FIG. 1, according to one or more embodiments.

FIG. 2 is a flowchart of a method 200 for enabling targeted messages based on usage of a document accessed within an Internet browser, as performed by the application 118 in cooperation with the browser 126 of FIG. 1, according to one or more embodiments. The method 200 records usage behavior data during usage of a document accessed within an Internet browser, and creates a usage data file including the usage behavior data. The method 200 starts at step 202 and proceeds to step 204.

At step 204, the method 200 receives a request for accessing a document within a browser of a user device. The document is one of the several document types known in the art, such as an ADOBE® PDF document, and the document is not a webpage. The document is associated with at least one application native to the document format, for example the ADOBE® READER®. When a user accesses a document, for example by accessing a URL hyperlinked to the document location, the document is downloaded to the browser, or a storage location designated for storing, permanently or temporarily, material downloaded using the browser.

The method 200 proceeds to step 206, where the method 200 invokes a plug-in registered with the browser for handling the document selected for access at step 204. Upon receiving the request for access of the document, the plug-in is operable to launch the application associated with the document type, within the browser.

The method 200 proceeds to step 208, where the method 200 launches the application within the browser. According to various embodiments, the plug-in launches the application within the browser. The application is a document processing application native to the document type, for example, ADOBE® READER®.

The method 200 proceeds to step 210, where the method 200 renders the document for access within the browser. The application displays the document within the browser in its native format. The application enables further processing of the document in its native format from within the browser, as known in the art.

The method 200 proceeds to step 212, where the method 200 creates a usage data file. For example, the document processing application or the usage data file creator creates the usage data file, including basic information related to the document access, such as, document ID, time and date of access, and IP address of the device from which the document is accessed.

The method 200 proceeds to step 214, where the method 200 tracks or captures usage behavior data based on user interaction with the document accessed in the browser. The document processing application can access the document level data, application level data and the system level data. For example, the application has access to the document level data of the document being accessed, e.g. document ID, keywords or metadata for the document or any parts thereof, and the like. According to several embodiments, the application can track if a document has been signed electronically, or if a document has been modified for being signed electronically. A document can be signed electronically or be modified for being signed electronically using, for example, ADOBE® ECHOSIGN®. The application also logs information on activities or events the application executes within the browser. Specifically, any functionality in the application invokes a corresponding function at the application binary level, details of which are captured by the application. For example, when a print command is requested, the application print function is invoked, and the application logs the date, time, and frequency of invocation of the print function. The application can query the operating system of the device, for example, the operating system 116 of FIG. 1, to obtain information including the IP address of the device, operating system identification information, and details of CPU, memory and installed devices, for example. According to several embodiments, a usage tracker component of the application captures one or more of the document level, application level or system level information as usage behavior data. A usage data file creator component of the application creates a usage data file, for example as discussed at step 212, using information captured by the usage tracker or the application, and the usage data file creator stores the usage behavior data generated by the usage tracker to the usage data file.

The usage behavior data includes information on user actions on the document or parts thereof. The usage behavior data includes, without limitation, one or more of document level, application level or system level information, such as, document ID, date of access, time of access, IP address of the user device or the browser on which the document is accessed, keywords specifying or indicating the document content, time spent on the document, time spent per page of the document, time spent per section of the document, if a search is conducted within the document, keywords searched for, printing the document or parts thereof, if the document is shared over email, if the document is saved, for example locally on the user device or any other location, if the document is zoomed in/out, the sections zoomed in/out, bookmarks accessed for navigation within the document, if a user copies text from the document, if a user copies an image from the document, if a user takes a snapshot of the document, if a user clicks on a link in the document, and the like.

The method 200 proceeds to step 216, where the method 200 stores the usage behavior data to a usage data file. The application or the usage data file creator stores the usage behavior data tracked or captured at step 214 to the usage data file. Further, in some embodiments (not shown), the method 200 iterates steps 214 and 216 to capture usage behavior data for each user interaction in a particular session of document accessed in the browser. According to several embodiments, the method 200 stores usage behavior data for documents accessed from related documents in a common usage data file. For example, for all documents from NIKON® website accessed within the browser, the usage behavior data is stored to a single usage data file.

Usage behavior data comprising one or more of the user actions, and document data, as described above, indicates a level of interest a user has in the document accessed within the browser. For example, a high level of interest may be inferred if a user prints the document, saves the document, or copies text or images from the document. Similar inference to a user's interest may be drawn, for example, if a user spends a relatively substantial amount of time on a particular portion of the document. The method 200 records each user action and/or document data as usage behavior data during access of the document within the browser.

According to various embodiments, the method 200 stores the usage data file at a pre-specified location on the user device or on a network location at step 216. The pre-specified locations include one or more of storage location defined for the application, storage location defined for the browser, or storage location defined for a user device. The storage location is defined, for example, for the benefit of third party entities, such as an advertisement server, or a website server, so that the third party entities may access the usage data file stored in the storage location, analyze the usage data for the document, and provide relevant messages to the user based on the usage behavior data. The method 200 proceeds to step 218 and ends.

Figure 3:
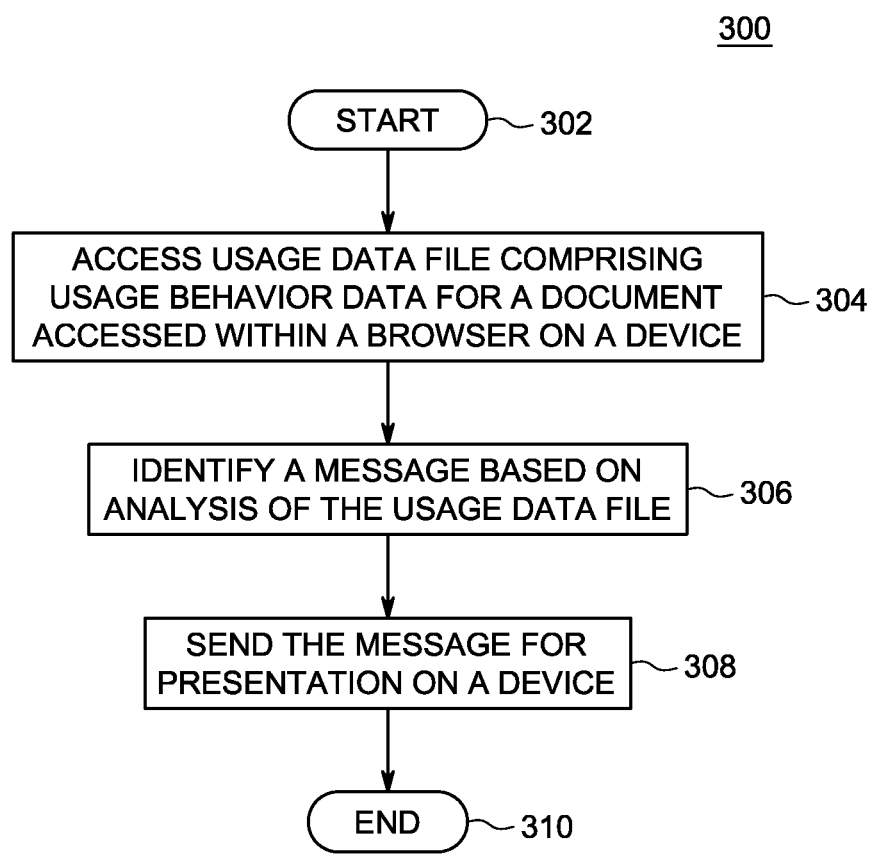
FIG. 3 is a flowchart of a method for providing targeted messages based on usage of a document accessed within an Internet browser, as performed by the usage behavior data analysis module of FIG. 1, according to one or more embodiments.

FIG. 3 is a flowchart of a method 300 for providing targeted messages based on usage of a document accessed within an Internet browser, as performed by the usage behavior data analysis module 168 of FIG. 1, according to one or more embodiments. The method 300 accesses usage behavior data from a usage data file. The method 300 analyses the usage behavior data to identify one or more messages for presentation on the user device. Each message is identified based on the interests of the user as identified from analyzing the usage behavior data. The method 300 starts at step 302 and proceeds to step 304.

At step 304, the method 300 accesses a usage data file comprising usage behavior data associated with a document accessed within the browser. The usage data file includes data comprising information on user behavior with a document accessed within an Internet browser, and document data, for example, document ID, keywords specifying the document content, electronic signatures, and the like. The usage data file may be accessed from a pre-specified location on the user device, for example, a storage location generally associated with the application, a storage location generally associated with the browser, a storage location generally associated with an operating system of the user device, or a location on the network.

The method 300 proceeds to step 306, where the method 300 identifies one or more messages based on the usage behavior data. The usage behavior data comprises information on user actions and document data that indicate a level of interest of the user in the document or parts thereof. The usage behavior data is analyzed to infer the user's level of interest in the document or portions thereof. For example, if the user printed, copied or stored the document, or a portion thereof, it may be inferred that the user has a high level of interest in the content of the document, or the portion thereof. Similarly, other analysis techniques known in the art may be used to infer the interest of the user, and identify messages based on such analysis.

The method 300 proceeds to step 308, where the method 300 sends the one or more messages identified at step 306 for presentation on the user device. For example, the method 300 may send a message identified as relevant (or of interest) to the browser on the user device for display to the user. The message can be displayed on one of the user's devices using several display channels. The message can be displayed within the browser, for example, in an area external to the document within the browser, within the document displayed within the browser, in the browser in a different browsing session, in a different document accessed within the browser, or in a document accessed using the document processing application without the browser. The method 300 proceeds to step 310 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
    receiving, from a server and within a web browser, webpage content comprising a link to an electronic document, the electronic document comprising a portable document format (PDF);
    detecting a selection of the link to the electronic document requesting access to the electronic document;
    identifying that the electronic document comprises a document having a PDF file format;
    in response to detecting the selection of the link to the electronic document and identifying that the electronic document has the PDF file format, launching, via a plug-in registered with the web browser, an application associated with the PDF file format within the web browser;
    rendering, by at least one processor and within the web browser, the electronic document in the PDF file format using the application associated with the PDF file format; and
    generating, by the at least one processor and using the application associated with the PDF file format, a usage behavior data file comprising usage behavior data with regard to the electronic document in the PDF file format during usage of the electronic document rendered within the web browser.

2. The method of claim 1, further comprising:
    storing the usage behavior data file at, at least one of a location associated with the web browser, a location associated with the application, a pre-specified location on a device, or a pre-specified network location.

3. The method of claim 2, further comprising transmitting the usage behavior data file to a pre-specified network location for analysis of the usage behavior data, and identification of one or more messages for presentation based on the analysis of the usage behavior data.

4. The method of claim 1, wherein the PDF file format comprises a native PDF file format.

5. The method of claim 1, further comprising presenting a message on a device based on the usage behavior data.

6. The method of claim 1, wherein the application is not a web browser application.

7. The method of claim 1, wherein the usage behavior data comprises information on at least one of a date of access, time of access, IF address of a device, or an amount of time spent on the electronic document.

8. The method of claim 1, wherein the usage behavior data comprises information on at least one of a document ID, a keyword specifying content of the electronic document, an electronic signature, an amount of time spent per page of the electronic document, an amount of time spent per section of the electronic document, whether a search is conducted within the electronic document, one or more keywords searched within the electronic document, whether the electronic document is printed, whether the electronic document is shared, whether the electronic document is saved locally, whether the electronic document is saved to a network location, whether the electronic document is zoomed in/out, identification of a section of the electronic document that was zoomed in/out, a bookmark accessed for navigation within the electronic document, whether text was copied from the electronic document, whether an image was copied from the electronic document, whether a snapshot was taken of the electronic document, or whether a hyperlink was accessed within the electronic document.

9. The method of claim 1, further comprising:
    providing, to the server, the usage behavior data with regard to the electronic document in the PDF file format during usage of the electronic document rendered within the web browser;
    receiving, from the server and within the web browser, additional webpage content; and
    receiving, from the server and based on the usage behavior data, a message to display in in conjunction with the additional webpage content within the web browser.

10. An apparatus for enabling targeted messages based on usage of documents accessed within an Internet browser comprising:
    at least one processor; and
    at least one non-transitory computer-readable medium storing instructions thereon that, when executed by the at least one processor, cause the apparatus to:
        receive, from a server and within a web browser, webpage content comprising a link to an electronic document, the electronic document comprising a portable document format (PDF);
        detect a selection of the link to the electronic document requesting access to the electronic document;
        identify that the electronic document comprises a document having a PDF file format;
        in response to detecting the selection of the link to the electronic document and identifying that the electronic document has the PDF file format, launching, via a plug-in registered with the web browser, an application associated with the PDF file format within the web browser;
        render, within the web browser, the electronic document in the PDF file format using the application associated with the PDF file format; and
        generating, using the application associated with the PDF file format, a usage behavior data file comprising usage behavior data with regard to the electronic document in the PDF file format during usage of the electronic document rendered within the web browser.

11. The apparatus of claim 10, wherein the application executes within the web browser, wherein generating the usage behavior data file comprises capturing at least one of document level data, application level data or system level data as usage behavior data, wherein the application is not a browser application, and wherein the instructions further cause the apparatus to store the usage behavior data file at, at least one of a location associated with the web browser, a location associated with the application, a pre-specified location on the apparatus, or a pre-specified network location.

12. The apparatus of claim 10, wherein the instructions further cause the apparatus to transmit the usage behavior data file to a pre-specified network location for analysis of the usage behavior data, and identification of one or more messages for presentation based on the analysis of the usage behavior data.

13. The apparatus of claim 10, wherein the usage behavior data comprises information on at least one of a document ID, a keyword specifying content of the electronic document, an electronic signature, an amount of time spent per page of the electronic document, an amount of time spent per section of the electronic document, whether a search is conducted within the electronic document, one or more keywords searched within the electronic document, whether the electronic document is printed, whether the electronic document is shared, whether the electronic document is saved locally, whether the electronic document is saved to a network location, whether the electronic document is zoomed in/out, identification of a section of the electronic document that was zoomed in/out, a bookmark accessed for navigation within the electronic document, whether text was copied from the electronic document, whether an image was copied from the electronic document, whether a snapshot was taken of the electronic document, or whether a hyperlink was accessed within the electronic document.

14. The apparatus of claim 10, wherein the instructions further cause the apparatus to:
provide, to the server, the usage behavior data with regard to the electronic document in the PDF file format during usage of the electronic document rendered within the web browser;
receive, from the server and within the web browser, additional webpage content; and
receive, from the server and based on the usage behavior data, a message to display in in conjunction with the additional webpage content within the web browser.

15. A non-transitory computer readable medium for storing computer instructions that, when executed by at least one processor causes the at least one processor to perform a method for enabling targeted messages based on usage of adocuments accessed within an Internet browser, comprising:
receiving, from a server and within a web browser, webpage content comprising a link to an electronic document, the electronic document comprising a portable document format (PDF);
detecting a selection of the link to the electronic document requesting access to the electronic document;
identifying that the electronic document comprises a document having a PDF file format;
in response to detecting the selection of the link to the electronic document and identifying that the electronic document has the PDF file format, launching, via a plug-in registered with the web browser, an application associated with the PDF file format within the web browser;
rendering, within the web browser, the electronic document in the PDF file format using the application associated with the PDF file format; and
generating, using the application associated with the PDF file format, a usage behavior data file comprising usage behavior data with regard to the electronic document in the PDF file format during usage of the electronic document rendered within the web browser.

16. The computer readable medium of claim 15, wherein the method further comprises:
storing the usage behavior data file at, at least one of a location associated with the web browser, a location associated with the application, a pre-specified location on a device, or a pre-specified network location.

17. The computer readable medium of claim 15, wherein the PDF file format comprises a native PDF file format.

18. The computer readable medium of claim 15, further comprising:
transmitting the usage behavior data file to a pre-specified network location for analysis of the usage behavior data and identification of one or more messages for presentation based on the analysis of the usage behavior data; and
presenting the one or more messages based on the usage behavior data.

19. The computer readable medium of claim 15, wherein the usage behavior data comprises information on at least one of a date of access, time of access, IP address of a device, or an amount of time spent on the electronic document.

20. The computer readable medium of claim 15, wherein the usage behavior data comprises information on at least one of a document ID, a keyword specifying content of the electronic document, an electronic signature, an amount of time spent per page of the electronic document, an amount of time spent per section of the electronic document, whether a search is conducted within the electronic document, one or more keywords searched within the electronic document, whether the electronic document is printed, whether the electronic document is shared, whether the electronic document is saved locally, whether the electronic document is saved to a network location, whether the electronic document is zoomed in/out, identification of a section of the electronic document that was zoomed in/out, a bookmark accessed for navigation within the electronic document, whether text was copied from the electronic document, whether an image was copied from the electronic document, whether a snapshot was taken of the electronic document, or whether a hyperlink was accessed within the electronic document.

* * * * *